United States Patent [19]

Mouchart et al.

[11] Patent Number: 4,840,442
[45] Date of Patent: Jun. 20, 1989

[54] MULTIDIELECTRIC MIRROR FOR CARBON DIOXIDE LASER PROVIDING THE MID INFRARED, IN HIGH REFLECTANCE WITH GOOD PROTECTION AGAINST MECHANICAL ATTACK

[75] Inventors: Jacques Mouchart, L'Hay les Roses; Gérard Villela, Marcoussis; Franck Dutois, Antony; Bernard Pointu, Ballancourt sur Essonne, all of France

[73] Assignee: Compagnie Generale D'Electricite, Paris, France

[21] Appl. No.: 112,159

[22] Filed: Oct. 26, 1987

[30] Foreign Application Priority Data

Oct. 28, 1986 [FR] France ............................... 86 14971

[51] Int. Cl.[4] .......................... G02B 1/10; G02B 5/00; B32B 33/00
[52] U.S. Cl. ..................................... 350/1.6; 350/164; 428/333
[58] Field of Search ......................... 350/164, 600, 1.6; 428/333

[56] References Cited

U.S. PATENT DOCUMENTS 4,388,344  6/1983  Shuskus et al. ...................... 427/38

FOREIGN PATENT DOCUMENTS 2326713  4/1977  France .

OTHER PUBLICATIONS

OG abstract of U.S. Patent #3,432,225 (Rock, 3-11-69).
Applied Optics, vol. 18, No. 17, Sep. 1979, pp. 2979-2989, Optical Society of America, New York; USA, A. M. Ledger: "Inhomogeneous Interface Laser Mirror Coatings".

Primary Examiner—Rodney B. Bovernick
Assistant Examiner—David J. Edmondson
Attorney, Agent, or Firm—Sughrue, Mion, Zinn, Macpeak & Seas

[57] ABSTRACT

A multidielectric mirror, in particular for the mid infrared, in which the last optical layer of a multidielectric stack is constituted by a composite layer including a thin protective surface layer of a material of amorphous structure together with a high index and very low absorption dielectric layer, with the thicknesses of these two layers being designed to obtain maximum reflectance given the indices of these materials. The protective layer is preferably made of amorphous hydrogenated silicon. The invention is applicable, in particular, to making carbon dioxide power lasers.

4 Claims, 2 Drawing Sheets

MULTIDIELECTRIC MIRROR FOR CARBON DIOXIDE LASER PROVIDING THE MID INFRARED, IN HIGH REFLECTANCE WITH GOOD PROTECTION AGAINST MECHANICAL ATTACK

The term "mid infrared" is used herein for light having a wavelength lying between one and twelve micrometers. Such light is provided, in particular, by those lasers which are most used for producing high energies, namely carbon dioxide lasers ($CO_2$). Mirrors for carbon dioxide lasers must reflect radiation which is emitted at a wavelength in the vicinity of 10.6 micrometers. The reflecting surfaces of such mirrors must have the following qualities to as great an extent as possible:
high reflectance;
a high limit for withstanding power density;
excellent mechanical hardness; and
very good resistance to external chemical attack.

Unfortunately, it has not been possible to obtain all of these qualities simultaneously with the conventional materials used heretofore.

BACKGROUND OF THE INVENTION

More precisely, the current state of the art is as follows:

Polished metal surfaces such as copper, molybdenum or stainless steel used as mirrors are reflective in the infrared but do not have a sufficiently high degree of reflectance for the desired uses, with the desired reflectance being not less than 0.995. The reflectances of these materials are situated respectively at about 0.99, 0.98 and 0.90 at the wavelength under consideration. This may be seen from the article "Pulsed $CO_2$ laser damage in windows, reflectors, and coatings" by Wang, Rudisill, Giuliano, Braunstein and Braunstein, published in NBS special publication No. 414 entitled "Laser induced damage in optical material". The three above-mentioned materials have good high-power performance, but copper is a soft material and in this respect has inadequate mechanical strength.

The reflectance is increased by putting a layer of silver or gold on the metal support. In the infrared, these two metals have higher reflectances (0.993 and 0.988) and their high-power thresholds are high. The methods most commonly used for making such surfaces include vacuum evaporation or cathode sputtering. Another advantage of using these metals lies in the fact that non-metallic materials can then be used as supports. Mention may be made of silicon, for example, which even though it has a low coefficient of reflection (R=0.30), becomes usable once the thickness of the deposited metal layer is large enough for the layer to be considered as being solid. This condition is achieved when the thickness of the layer is approximately a few hundredths of a wavelength. A thickness of 150 nm is often enough. However, silver has poor chemical performance in the environment since it has very high affinity for sulfur; in addition, neither gold nor silver is hard enough for providing good mechanical properties.

A conventional method currently in use for increasing reflectance consists in making a stack of dielectric layers alternating between a high index $n_H$ and a low index $n_B$ such that their optical thicknesses $n_H e_H$ and $n_B e_B$ over the support which is already covered in gold or silver (where $e_H$ and $e_B$ refer to the geometrical thicknesses of the layers) are one quarter of a wavelength or thereabout. The reflectance of a metal layer in terms of its complex index n-ik (where $i^2 = -1$, n is its refractive index, and k is its extinction index) is given by the relationship:

$$R = 1 - \frac{4n}{(1+n)^2 + k^2}$$

With a stack of 2p transparent dielectric layers, i.e. layers having substantially zero extinction indices, the reflectance increases to the value:

$$R = 1 - \frac{4qn}{(q+n)^2 + k^2} \text{ where } q = \left(\frac{n_B}{n_H}\right)^{2p}$$

with a layer of index $n_B$ being deposited on the metal layer. In order for the reflectance to be as high as possible with a given number of layers, it is desirable for the index of the low index material to be as low as possible and the index of the high index material to be as high as possible.

In practice, dielectrics always absorb at least a little (their extinction indices $k_H$ and $k_B$ are not exactly zero). The limiting reflectance then no longer tends towards 1 as the number of layers increases indefinitely, but towards a limiting value given by Koppelmann:

$$R_{limit} = 1 - 6.283 \frac{k_H + k_B}{n_H^2 - n_B^2}$$

It can thus be seen that in order to obtain high reflectance values, it is necessary for the selected materials to absorb very little ($k_H$ and $k_B$ being not more than a few $10^{-4}$).

By way of example, FIG. 1 shows a deposit made on a molybdenum support 11 having deposited successively thereon by vacuum evaporation: a layer of silver 12; followed by two pairs of quarterwave dielectric layers, each pair comprising one layer of thorium fluoride (13 or 15) having an index 1.35 and one layer of zinc sulfide (14 or 16) having an index 2.2. This type of coating has a reflectance of 0.996 and its high-power performance limit is high. However, since the majority of materials which are transparent in the vicinity of a wavelength of 10.6 micrometers are not very hard, the final deposit has inadequate mechanical performance.

An improvement can be obtained by depositing a fine hard layer of a protective dielectric material such as a fluoride ($MgF_2$, $ThF_4$, $CeF_3$ or $LaF_3$) or an oxide ($TiO_2$, $ZrO_2$, $CeO_2$, $HfO_2$, $Y_2O_3$) onto the silver or the gold or onto the stack of dielectric layers. Under such conditions, the stack or the gold or the silver are better protected both mechanically and chemically. However two major defects remain:

the mechanical and chemical protection necessarily gives rise to reduced reflectance. This reduction increases with increasing index of the selected protective material, with increasing thickness of the protective layer, and with increasing infrared absorption therein; and the structure of the deposited dielectric layer generally includes holes which are distributed in columns. These holes are inherent to the manufacturing process. They fill with water vapor when the deposit is placed in air and prevent effective chemical protection against external agents from being obtained. This subject is described in the article entitled "Inhomogeneous interface laser mirror coatings" by A.M. Ledger appearing at pages 2979-2989 of the Sept. 1, 1979 number of Applied Optics vol. 18, No. 17 published by the Optical Society of America, New York, US.

Other protective layers may be obtained using amorphous materials such as carbon having high hardness (3000 kg/mm$^2$) and very low porosity. However, it is not possible to obtain sufficient reflectance with this material given the residual absorption of the layer and its refractive index which is too high (n about 1.8) for such conditions of use. Reference on this subject may be made to the article "Properties and coating rates of diamond-like carbon films produced by RF glow discharge of hydrocarbon gases" by L.P. Andersson, S. Berg, H. Norstrom, R. Olaison, S. Towta, in "Thin solid films" 63 (1979), pages 155-160.

Although the above-explained problem of reconciling optical qualities and protective qualities is being faced at present in particular with mid infrared radiation, it is clear that it could also arise in the future in other parts of the spectrum.

The present invention has the aim, in particular, of providing a stack of layers making it possible to simultaneously obtain the high reflectance required of a carbon dioxide laser mirror together with good protection against mechanical attack.

Another aim is to provide good protection against atmospheric agents and high high-power limit in a light flux such as that produced by a carbon dioxide power laser.

SUMMARY OF THE INVENTION

The present invention provides a multidielectric mirror for reflecting light situated, in particular, in the mid infrared, in particular light from a carbon dioxide laser, said mirror comprising:

a substrate;

a reflector on said substrate, said reflector being made up from a stack of quarter-wavelength layers which succeed one another from the substrate, said layers being essentially constituted by low absorption dielectric materials having low absorption for said light to be reflected and alternating between having low and high refractive indeces and terminating with a high index last layer, each of said layers having an optical thickness close to a quarter-wavelength of said light so as to confer high reflectance to said mirror;

said mirror including a protective surface layer constituted by a protective dielectric material having greater hardness than said high index dielectric material;

said mirror being characterized by the fact that at least the last of said high index quarter wavelength layers is a composite layer comprising:

a base layer whose optical thickness is a major fraction of the optical thickness of said composite layer and which is constituted by one of said dielectric materials having low absorption and high refractive index; and said protective surface layer, the optical thickness of said protective layer constituting a minor fraction of the optical thickness of the composite layer, and said protective material having a higher refractive index than said high index and low absorption dielectric material so as to simultaneously obtain at least mechanical protection for the stack together with increased reflectance even if the absorption of said protective material for said light is somewhat greater than the absorption of said low absorption dielectric materials.

Preferably, in accordance with the invention, said protective material has an amorphous structure and is more particularly constituted by amorphous hydrogenated silicon. The proportion of hydrogen therein, measured in moles, is preferably between 5% and 20%.

However, other materials may be used even though they appear to be less favorable, e.g. amorphous germanium, amorphous germanium-silicon alloys, amorphous carbon-silicon, etc...

Amorphous hydrogenated silicon has already been suggested for making high index quarter-wavelength thick layers in a multilayer mirror in the near infrared, i.e. at a wavelength of 1.06 micrometers. It has a high refractive index ($n_{Si}$ and 3). Reference may be made on this subject to the article "Recent developments in reactively sputtered optical thin films" by W. T. Pawlewicz, P. M. Martin, D. D. Hays, and I. B. Mann, at pages 105-116 of SPIE vol. 325 "Optical thin films " (1982).

However, in the mid infrared, its extinction index $k_{Si}$ is rather high (about $10^{-2}$) so that its absorption is too high for it to be usable as a layer having a thickness of about one quarter wavelength. In addition to its high index, this material has the following remarkable properties:

very low porosity due to its amorphous nature; and very high hardness and a high degree of inertness with respect to many chemical agents.

That is why, in the context of the present invention, a high index coating is made on the last layer to be deposited, with the resulting composite layer than being constituted by a high index layer of known type but of reduced thickness together with a layer of amorphous hydrogenated silicon.

The total optical thickness of this composite layer is close to a quarter-wavelength. The layer of amorphous silicon which is the last-deposited layer is in contact with the atmosphere and serves both as an optically active layer and as a protective layer.

In practice, known high index materials such as ZnS or ZnSe, for example, have refractive and extinction indices which are less than those of silicon. If they are used, theoretical calculation and experiment show not only that the reflectance is not significantly reduced by the presence of the amorphous hydrogenated silicon, but that there exist optimum thicknesses of silicon and known high index materials which give the reflectance a higher value than it would have had if the high index material had been used on its own: in other words using silicon in the last layer can increase reflectance. This increase is naturally related to the fact that the thickness of the silicon is low so its absorption remains limited.

BRIEF DESCRIPTION OF THE DRAWINGS

An implementation of the present invention is described in greater detail below by way of non-limiting example and with reference to the accompanying diagrammatic figures. It should be understood that the items mentioned may be replaced by other items providing the same technical functions.

MORE DETAILED DESCRIPTION

Amorphous silicon is a material which is well known in the fields of electronics and photovoltaic energy conversion. Reference may be made on this topic to the article entitled "Electronic properties of substitutionally doped amorphous Si and Ge" by Spear and Lecomber at pages 935-949 of Philosophical Magazine 1979 vol. 33 No. 6.

It may be deposited using various methods such as cathode sputtering, ion beam spraying, and vapor phase chemical decomposition assisted by a DC or a radio frequency plasma.

Figure 1:
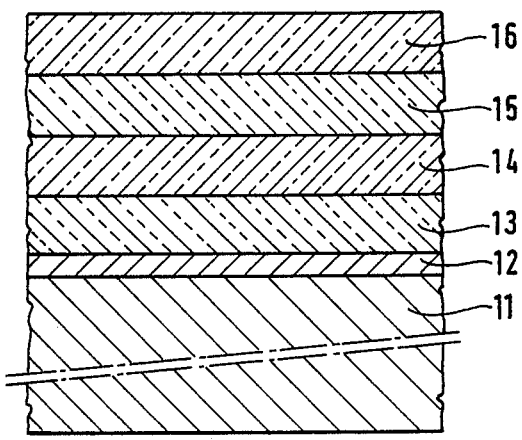
FIG. 1 is a section view through a prior art mirror described above.
Figure 2:
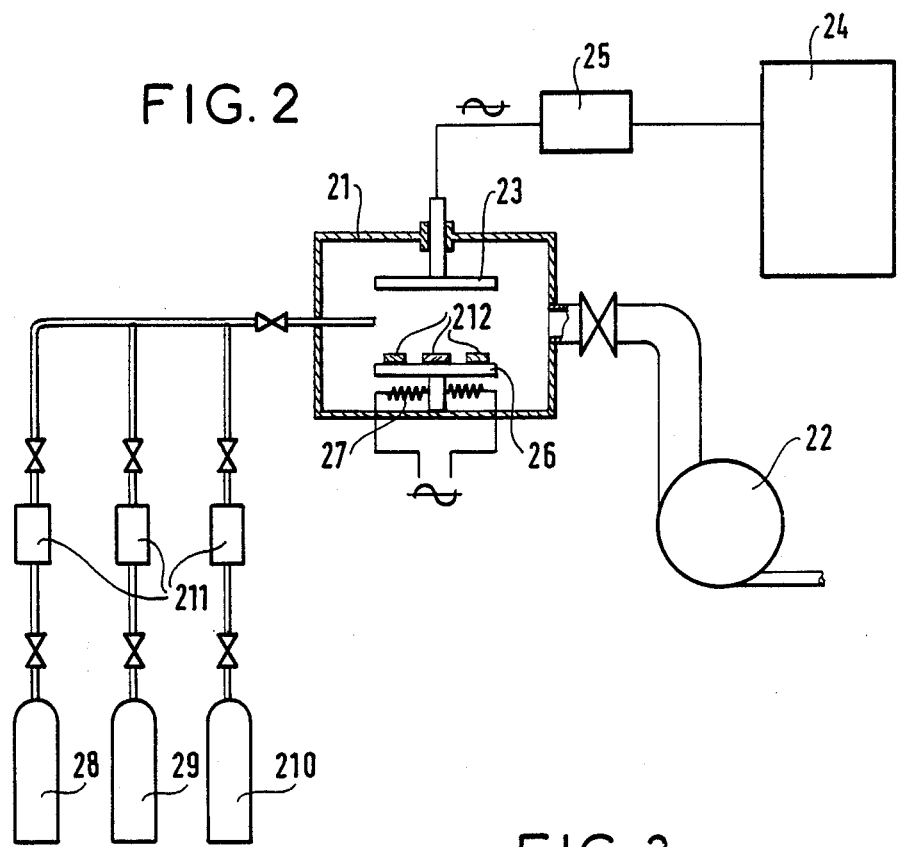
FIG. 2 is a block diagram of deposition apparatus for forming a protective layer in accordance with the invention.

The most widespread method is vapor phase chemical decomposition assisted by a radio frequency plasma and is described by way of example with reference to FIG. 2. A reactor is constituted by an enclosure 21 in which pressure is reduced by a vacuum pump 22, and having a cathode 23 connected to a radio frequency generator 24 via a connection module 25 together with an anode 24 which is capable of being heated by means of resistances 27. A gaseous mixture is made from cylinders of silane (SiH4) 28 optionally in conjunction with hydrogen 29 or some other carrier gas 210. The gaseous mixture is conveyed in the reactor via flowmeters 211. It decomposes in the plasma created by the radio frequency power applied to the cathode. The reaction products are deposited on the substrate 212 and form a thin film constituted by amorphous silicon in which the broken chemical bonds are compensated by hydrogen. The properties of this film depend on the substrate temperature, on the position it occupies (on the anode or on the cathode), on the pressures and the flow rates of the various gases, and on the injected radio frequency power.

Figure 3:
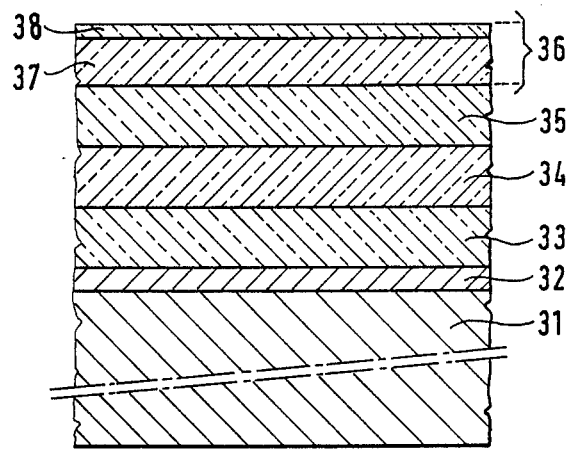
FIG. 3 is a view through a mirror in accordance with the invention.

In the following example, a stack made in accordance with the invention is described. FIG. 3 shows a molybdenum substrate 31 having a 150 nm thick layer of silver 32 deposited thereon and covered with allow index layer of thorium fluoride 33 having a thickness $e_1 = 1.96$ micrometers, with a high index layer of zinc selenide ZnSe 34 of thickness $e_2 = 1.13$ micrometers, a layer of thorium fluoride 35 analogous to the layer 33, and a composite layer 36. The composite layer comprises a high index base layer of zinc selenide 37 having a thickness $e = 0.995$ micrometers and a surface layer of amorphous hydrogenated silicon 38 having a thickness of 0.10 micrometers. The optical thickness of the composite layer is equal to a quarter-wavelength, i.e. 2.65 micrometers for use at a wavelength of 10.6 micrometers. The layers of silver, of ThF4 and of ZnSe are deposited by vacuum evaporation, and the layer of amorphous silicon is deposited using the method described in the above example.

Such a coating has a reflectance equal to 0.9975 and also has good high-power performance in a laser beam.

By way of comparison, if the last layer were a quarter-wave layer of ZnSe then the reflectance would be only 0.997 and the mechanical performance and the resistance to chemical agents would be less good.

We claim:

1. A multidielectric mirror for reflecting light in the mid infrared from a carbon dioxide laser, said mirror comprising:

a substrate;

a reflector on said substrate, said reflector being made up from a stack of quarter-wavelength layers which succeed one another from the substrate, said layers being essentially constituted by low absorption dielectric materials having low absorption for said light to be reflected and alternating between having low and high refractive indeces and terminating with a high index last layer, each of said layers having an optical thickness close to a quarter-wavelength of said light so as to confer high reflectance to said mirror;

said mirror including a protective surface layer constituted by a protective dielectric material having greater hardness than said high index dielectric material;

said mirror including the improvement whereby at least the last of said high index quarter wavelength layers is a composite layer comprising:

a base layer whose optical thickness is a major fraction of the optically thickness of said composite layer and which is constituted by one of said dielectric materials having low absorption and high refractive index; and said protective surface layer, the optical thickness of said protective layer constituting a minor fraction of the optical thickness of the composite layer, and said protective material having a higher refractive index than said high index and low absorption dielectric material so as to simultaneously obtain good mechanical protection for the stack together with increased reflectance even if the absorption of said protective material for said light is somewhat greater than the absorption of said low absorption dielectric materials.

2. A mirror according to claim 1, wherein said protective material is amorphous in structure and wherein its absorption for said light is indeed somewhat greater than the absorption of said low absorption dielectric materials.

3. A mirror according to claim 2, wherein said protective material is amorphous hydrogenated silicon.

4. A mirror according to claim 1, further including a reflecting metal layer between said substrate and said stack of quarter-wavelength layers, with the first of said quarter-wavelength layers being a low index layer.

* * * * *